(12) United States Patent
Hu et al.

(10) Patent No.: US 12,587,276 B2
(45) Date of Patent: Mar. 24, 2026

(54) FAST OPTICAL CABLE IDENTIFICATION USING ACOUSTIC PEN

(71) Applicant: NEC Laboratories America, Inc., Princeton, NJ (US)

(72) Inventors: Junqiang Hu, Davis, CA (US); Yue-Kai Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 279 days.

(21) Appl. No.: 18/485,198

(22) Filed: Oct. 11, 2023

(65) Prior Publication Data

US 2024/0235668 A1 Jul. 11, 2024

Related U.S. Application Data

(60) Provisional application No. 63/415,399, filed on Oct. 12, 2022.

(51) Int. Cl.
H04B 10/073 (2013.01)
G01H 9/00 (2006.01)

(52) U.S. Cl.
CPC ........... H04B 10/073 (2013.01); G01H 9/004 (2013.01)

(58) Field of Classification Search
None
See application file for complete search history.

(56) References Cited

U.S. PATENT DOCUMENTS 8,947,232 B2 * 2/2015 Strong ................... G01H 9/004
385/100

FOREIGN PATENT DOCUMENTS

CN 114111614 A * 3/2022 ............. G01B 11/16

* cited by examiner

*Primary Examiner* — Eric S. McCall
*Assistant Examiner* — Nigel H Plumb
(74) *Attorney, Agent, or Firm* — Vincent Duffy; Joseph Kolodka

(57) ABSTRACT

A fast optical fiber identification system and method employing an acoustic pen that is connected to a portable device (such as a laptop, a smartphone, an iPad). The pen generates acoustic signals under the control of the portable device. The portable device interacts with a DFOS (Distributed Fiber Optic Sensor, e.g., a DAS or DVS) interrogator to notify the interrogator about the generated signals and receives a detection result from the interrogator. The result is either illustrated using a graph on the portable device, or as a tone of different volume, to indicate the strength of the pen's signal detected by the interrogator. As the pen touches/ excites vibrationally/acoustically each of the fibers, the portable device notifies the user about the detected signal's strength or presence/no-presence, which allows a technician to quickly identify the fiber of interest.

5 Claims, 18 Drawing Sheets

DAC: Digital-to-analog converter
ADC: Analog-to-digital converter
DSP: Digital signal processing
WDM: Wavelength division multiplexer
BPF: Band-pass filter
LPF: Low-pass filter acoustic pen head handle Wireless communication display

FAST OPTICAL CABLE IDENTIFICATION USING ACOUSTIC PEN

CROSS-REFERENCE TO RELATED APPLICATIONS

This application claims the benefit of U.S. Provisional Patent Application Ser. No. 63/415,399 filed Oct. 12, 2022, the entire contents of which is incorporated by reference as if set forth at length herein.

FIELD OF THE INVENTION

This application relates to distributed fiber optic sensing (DFOS)/distributed acoustic sensing (DAS) systems, methods, and structures More particularly, it pertains to systems and methods for fast optical cable identification using an acoustic pen.

BACKGROUND OF THE INVENTION

Telecommunications services employing fiber optic facilities have become an indispensable aspect of contemporary life. An essential component of such fiber optic facilities is a fiber optic cable—a common assembly containing one or more optical fibers. Current fiber optic cables may contain many hundreds of individual optical fiber strands. Given the substantial number of individual optical fiber strands that may be included in a single fiber optic cable, the identification of an individual one of the optical fibers poses significant problems. The present disclosure describes systems and methods that provide fiber identification, to quickly locate an optical fiber of interest from a bunch of optical fibers.

SUMMARY OF THE INVENTION

An advance in the art is made according to aspects of the present disclosure directed to systems, methods, and structures that provide a fast fiber identification and quickly locate a single fiber of interest out of a plurality of optical fibers.

In sharp contrast to the prior art, systems, and methods according to the present disclosure employ an acoustic accessory (called an acoustic pen) that is connected to a portable device (such as a laptop, a smartphone, an iPad). The pen generates acoustic signals under the control of the portable device. The portable device interacts with a DFOS (Distributed Fiber Optic Sensor, e.g., a DAS or DVS) interrogator to notify the interrogator about the generated signals and receives a detection result from the interrogator. The result is either illustrated using a graph on the portable device, or as a tone of different volume, to indicate the strength of the pen's signal detected by the interrogator. As the pen touches/excites vibrationally/acoustically each of the fibers, the portable device notifies the user about the detected signal's strength or presence/no-presence, which allows a technician to quickly identify the fiber of interest.

Viewed from another aspect, the acoustic pen includes an acoustic device (a speaker or vibration device) that generates tones or codes detectable by the interrogator. The acoustic device is driven by the portable device. The pen may include a handle that can be held such that it conveniently moves across the fibers. The handle is vibrationally isolated from the pen itself, so that it does not affect the vibrational excitation to the optical fibers. When the pen touches the fiber of interest, the interrogator will detect a highest signal level—or other characteristic such as code—indicative of the fiber of interest.

Finally, an operating procedure according to the present disclosure provides for the interrogator to locate a segment or group of fibers of interest, then interactively identify a fiber of interest within the segment or group—thereby reducing the interrogator's processing requirement while providing fast identification.

BRIEF DESCRIPTION OF THE DRAWING

FIG. 8(A), FIG. 8(B), FIG. 8(C), FIG. 8(D) and FIG. 8(E) are a series of plots in which: FIG. 8(A) shows interrogator received signal amplitude with no or minor reflections; FIG. 8(B) shows interrogator signal spectrum at end of the fiber when reflection is low; FIG. 8(C) shows interrogator received signal amplitude with strong reflection; FIG. 8(D) shows interrogator processed signal at end of the fiber with strong reflection including alien tones; and FIG. 8(E) shows spectrum with generated acoustic signal and alien tones; all according to aspects of the present disclosure;

DETAILED DESCRIPTION OF THE INVENTION

Figure 1A:
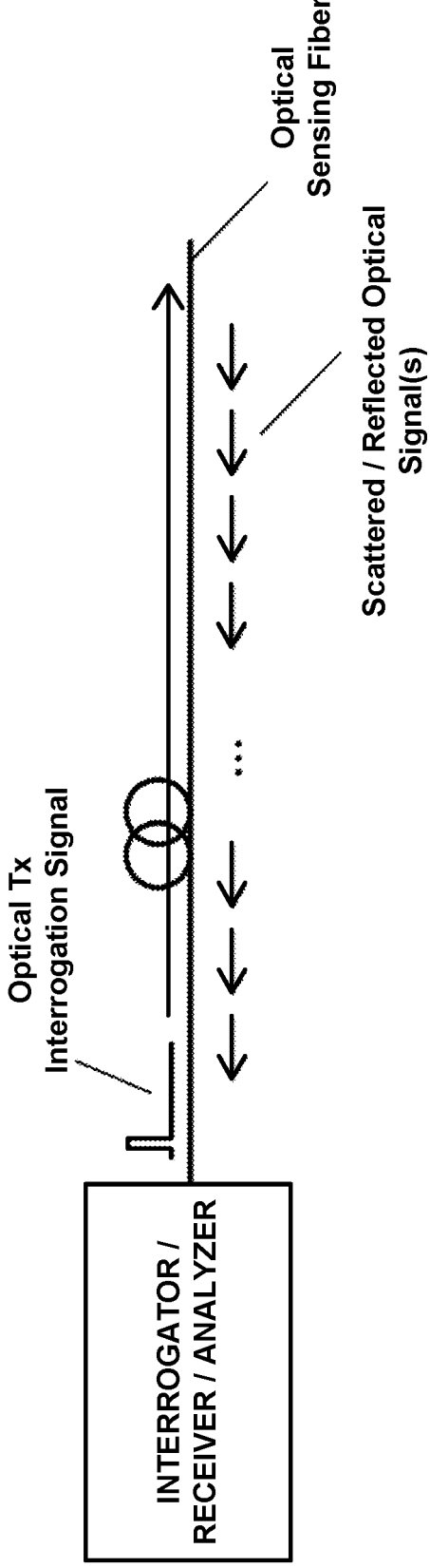
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
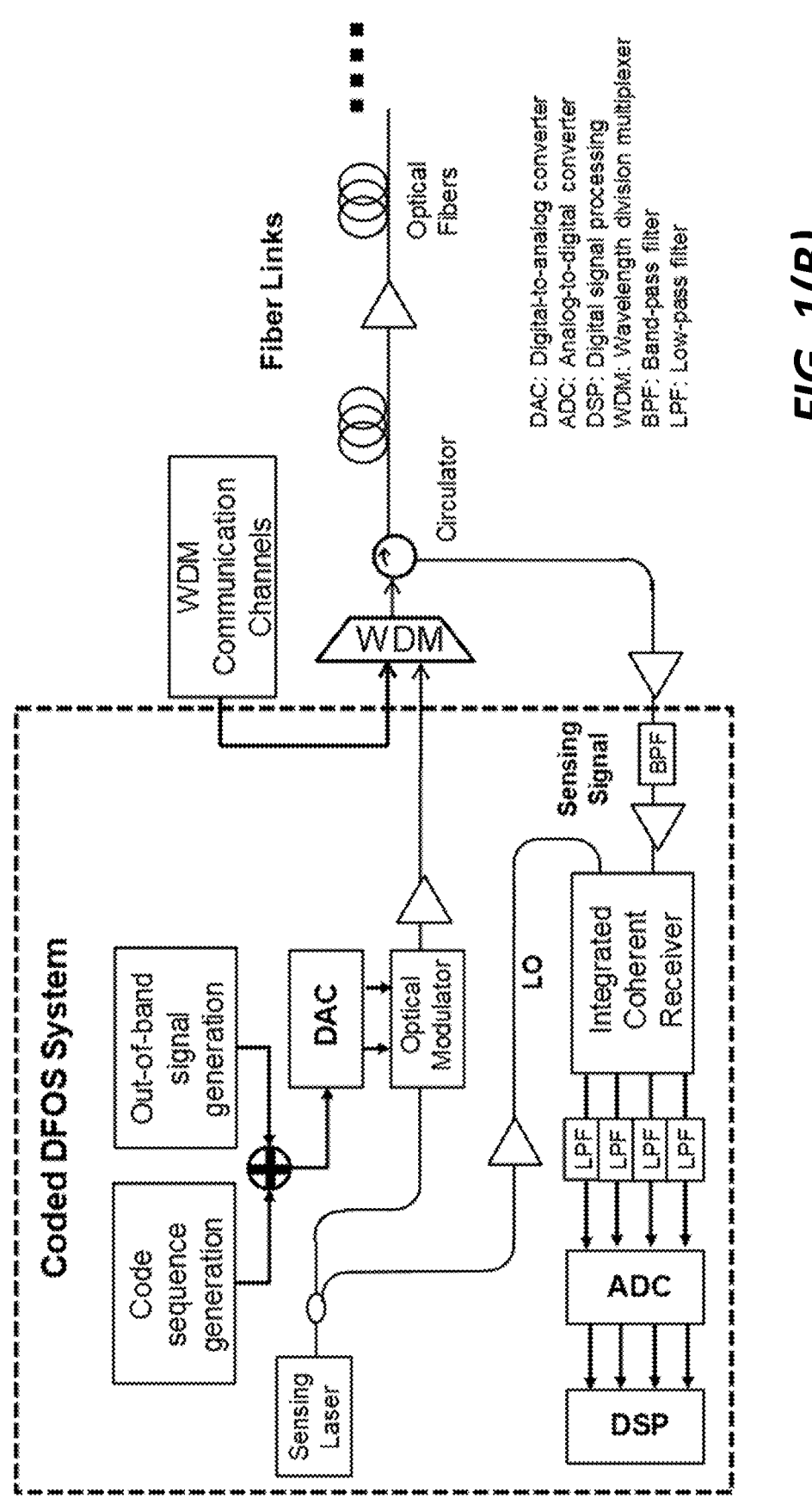

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. According to aspects of the present disclosure, classification methods may be further used to detect and locate events or other environmental conditions including acoustic and/or vibrational and/or thermal along the length of the optical sensing fiber.

As noted, the present disclosure describes systems, methods, and structures that provide the identification of an individual optical fiber which locates a fiber of interest when such fiber is one of many fibers that may be—for example—co-located in a single fiber optic cable.

Figure 2A:
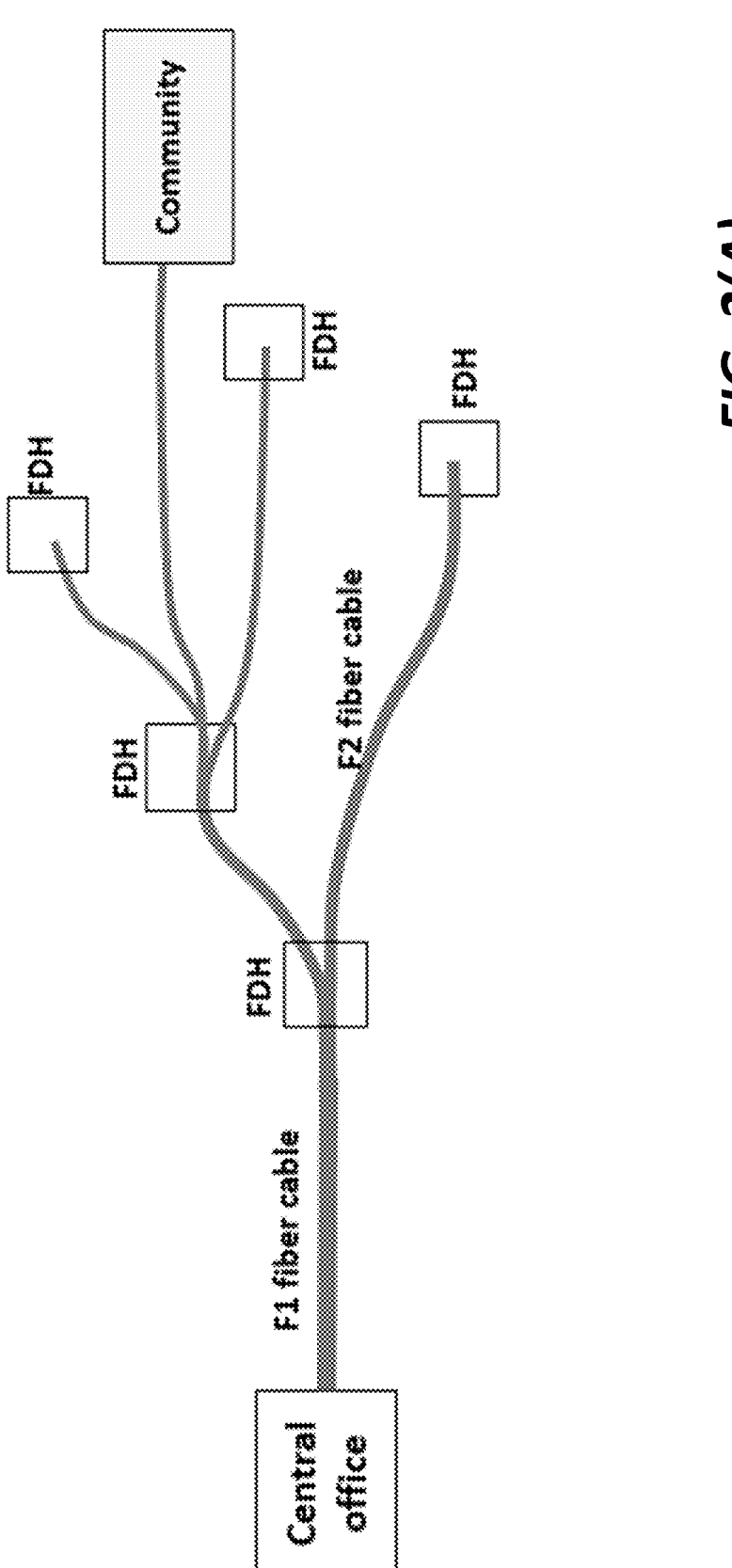
FIG. 2(A). Is a schematic diagram showing an illustrative fiber optic telecommunications architecture used by contemporary telecommunications carriers.

FIG. 2(A). Is a schematic diagram showing an illustrative fiber optic telecommunications architecture used by contemporary telecommunications carriers. As illustratively shown in this figure, it is a fiber distribution architecture used by telecom carriers to deliver service from central office to customers. The deployed fiber cables include F1 fiber (the major cable from the central office) and F2 fiber (drop fiber from fiber distribution hub or FDH). Each of these cables may have many hundreds of individual optical fibers inside, and there can be many cables laid in parallel, especially in the F1 fiber case. The deployment practice illustrated reduces the overall deployment cost, though an initial installation/service activation there may only be a few of the cables/fibers used, with the majority reserved for future expansion. As will be appreciated, when it is time to add new service or connect new customers, a fiber needs to be located from the bunch of cables to make the connection.

Figure 2B:
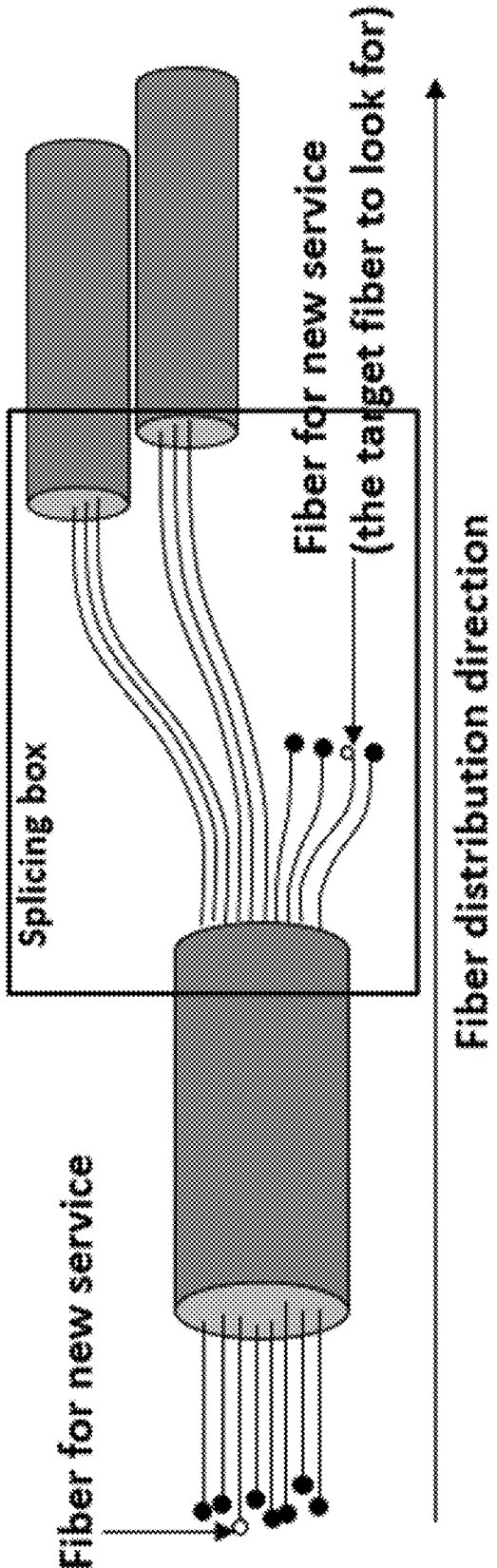
FIG. 2(B). Is a schematic diagram showing an illustrative exploded view of the fiber optic telecommunications cable of FIG. 2(A) showing individual optical fibers that may be employed for new services.

FIG. 2(B). Is a schematic diagram showing an illustrative exploded view of the fiber optic telecommunications cable of FIG. 2(A) showing individual optical fibers that may be employed for new services. As shown in this figure, after a free fiber head is picked up from the upper side, the corresponding fiber end needs to be located at a splicing box. This procedure is called fiber identification. The traditional solution uses fiber layout and color code for this operation, which requires prior information and a construction map or notes/photos made during the installation. Such information may not be available, or it is time consuming to look for the right instruction, considering that there are so many sites and cables to be managed.

Colored light is sometimes utilized in another widely used approach for optical fiber identification and involves injecting light from one end of the fiber and observing it at the other end. Unfortunately, this method does not work well when the fiber span is long because of the high loss.

As we shall show and describe further, systems, methods, and structures according to aspects of the present disclosure locate the fiber quickly, without the need of prior installation knowledge. In that regard, system, methods, and structures according to aspects of the present disclosure utilize an acoustic accessory (called an acoustic pen) that is connected to a portable device (such as a laptop, a smartphone, an iPad). The pen generates acoustic signal under the control of the portable device. The portable device interacts with a DFOS (Distributed Fiber Optic Sensor, e.g., a DAS or DVS) interrogator and notifies it of a signal it is generating and receives a detection result from the interrogator. The result may be either illustrated using a graph on the portable device, or as a tone of different volume, to indicate the strength of the pen's signal detected by the interrogator. As the pen sequentially excites/vibrates touches each individual one of the optical fibers of the fiber, the portable device notifies the user about the detected signal's strength or the presence/no-presence, which helps to quickly identify the fiber.

In an illustrative embodiment, the pen includes an acoustic device (a speaker or vibration device) that can generate tones or codes detectable by the interrogator. The acoustic device is preferably driven by the portable device. To facilitate convenience, the pen includes a handle that can be held by a technician to move across the fibers. When the pen contacts a fiber of interest, the interrogator will detect the highest signal level.

The actively generated acoustic signal of the acoustic pen is controlled by the portable device, and the portable device's interaction with the interrogator about the detected signal strength. Our fiber identification method—identifies the optical fiber exhibiting the strongest interrogator response while moving the pen across the number of individual optical fibers. One aspect of our procedure first identifies a segment of interest, then interactively identifies a fiber of interest, to reduce the interrogator's processing requirement while providing fast identification. As those skilled in the art will understand and appreciate, such a segment is a group of optical fibers that includes fewer individual fibers than a fiber optic cable of which they are a part. In that regard a group of fibers may be tested and compared with another group of fibers. The group exhibiting the strongest signal can then be tested with another group of fibers. The procedure may continue until the group with the strongest signal has been identified. Then, smaller groups withing that initial group may be tested similarly, until a final group is identified. At that time, individual fibers may be tested to identify the individual fiber of interest.

Figure 3:
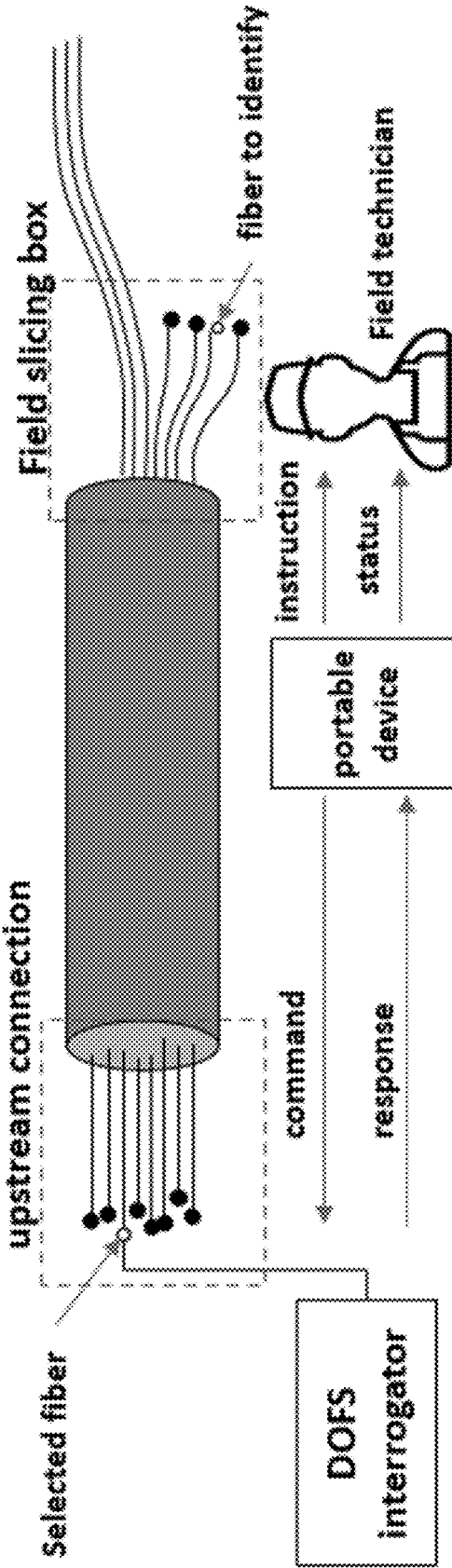
FIG. 3 is a schematic flow diagram showing an illustrative arrangement and overall operational method for optical fiber identification according to aspects of the present disclosure.

FIG. 3 is a schematic flow diagram showing an illustrative arrangement and overall operational method for optical fiber identification according to aspects of the present disclosure. As illustratively shown in the figure, a DFOS interrogator located at the upstream (such as central office) of the fiber cable, and connected to the selected fiber, is used to generate sensing signal and detect fiber status; a portable device in the field where the other end of the fiber is to be identified, to interact with the interrogator and receive real-time response; a field technician to operate the portable device and use the response to get the fiber of interest. The portable device works as the master device, to send command to the interrogator and receive the feedback; mean while it instructs the field technician for operation and provides real-time status.

Figure 4:
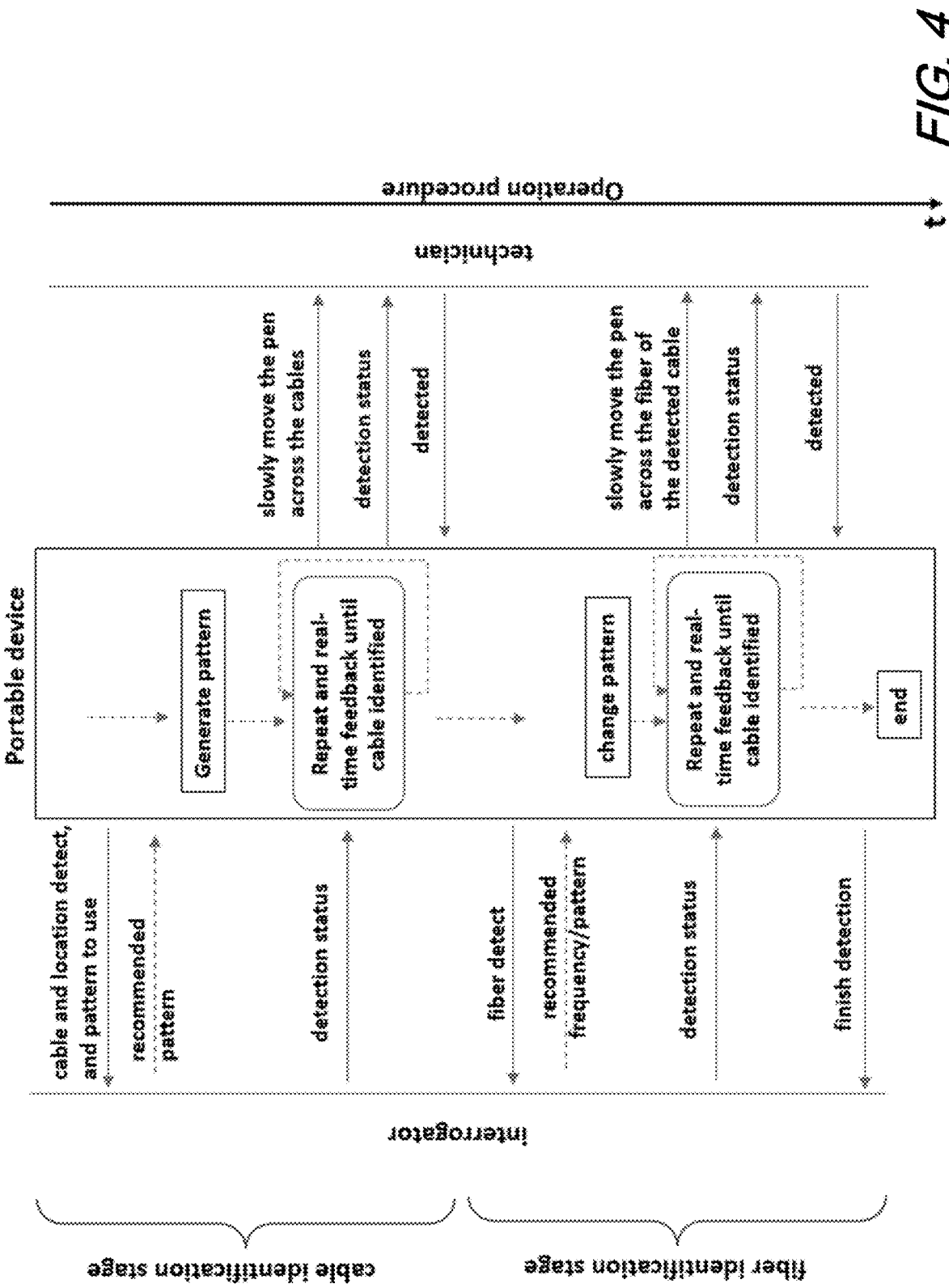
FIG. 4 is a schematic swim lane diagram showing illustrative operational procedure of a method for optical fiber identification according to aspects of the present disclosure.

FIG. 4 is a schematic swim lane diagram showing illustrative operational procedure of a method for optical fiber identification according to aspects of the present disclosure. As illustratively shown in the figure, the operating procedure includes a cable identification stage and fiber identification stage, At the start of our inventive procedure, the portable device connects to the interrogator (e.g., using wireless communication), and notifies it to start cable and location detection. The interrogator may recommend the generated signal frequency/pattern to the portable device, or let the device use the default pattern. The portable device then outputs the corresponding acoustic signal and informs the field technician to move the pen and touch each of the cables. At the same time, the interrogator detects the vibration along the entire fiber, and checks whether it can detect the expected pattern, and its strength if detected. This information is fed back to the portable device in real-time, and further forwarded to the technician. The cable with the strongest response is the one of interest. The interrogator marks the location along the fiber where the pattern is detected and will focus on this section (or adjusted location) of the fiber in the second stage.

Usually, the fiber section inside the cable is stable and has lower noise at the interrogator's vibration response. Using this section for pattern detection helps quickly find the location. When fiber runs out of the cable where connection is made, mostly they are floating so the vibration response will be noisy.

After the cable is identified, the second stage is fiber identification, which is to find the exact fiber. This step uses selected frequency tones and designed patterns for noise tolerance. The interrogator focuses on the section that covers the fiber out of its cable. This step also starts from the portable device by sending out a "fiber detect" command with acoustic pen turned off. The interrogator switches to detailed spectrum and pattern detection mode, to look for the frequency/pattern of interest. It may first scan for the existing tones which are considered as noise and should be avoided when generating the acoustic pattern. The interrogator then informs the portable device its selected frequency and pattern. The portable device follows the instructions, generates output, and notifies the field technician to scan the fibers of the found cable one by one. The interrogator sends its detection status in real time back to the portable device, which then forwards the status to let the technician know, for fiber identification. Once the fiber with the strongest response is identified, the fiber is found so the task ends.

Figure 5:
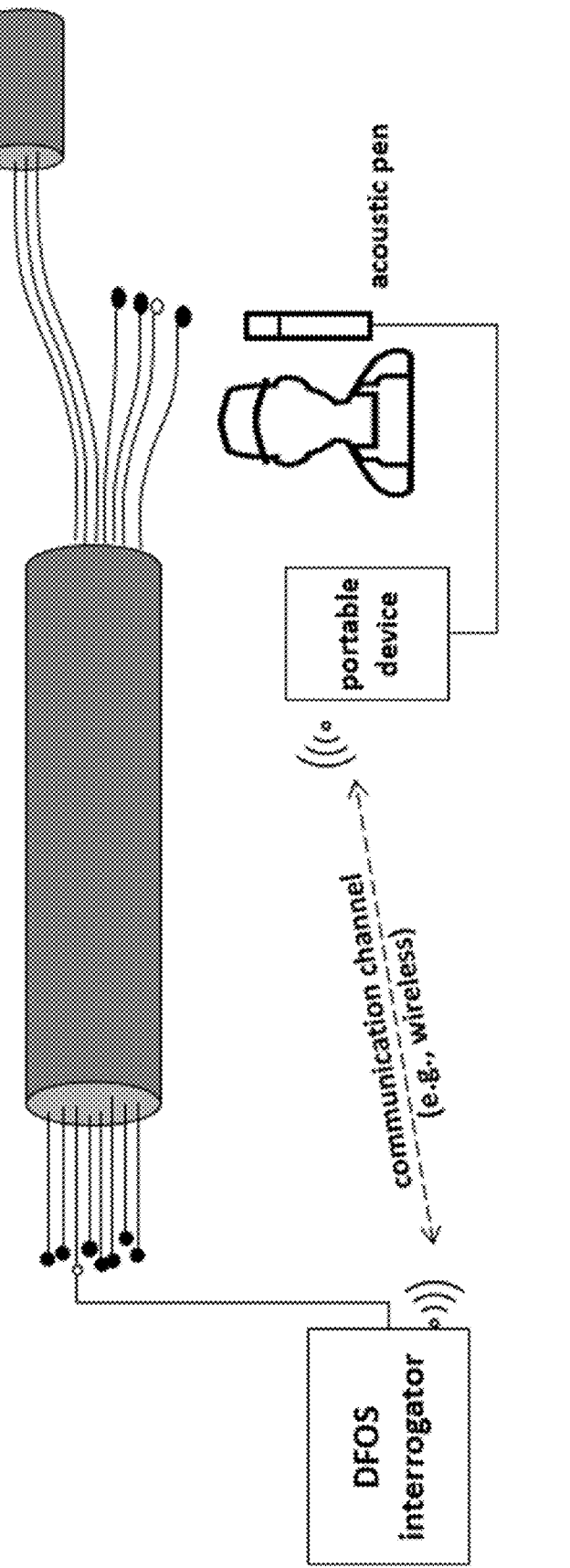
FIG. 5 is a schematic diagram showing illustrative arrangement and operation of a method according to aspects of the present disclosure.

FIG. 5 is a schematic diagram showing illustrative arrangement and operation of a method according to aspects of the present disclosure. As illustratively shown, our inventive system and method employs a DFOS interrogator at the upper site of the fiber (such as in the central office) and has a field technician using a portable device (such as a laptop, a smartphone, or an iPad) in the downstream distribution hub to look for the selected fiber. The portable device has an attached acoustic pen, that can generate acoustic patterns under the control of the portable device. The portable device interacts with the DFOS interrogator, to inform the current operation and the pattern it is generating. The interrogator detects the pattern upon request and notifies the portable device the detecting status. This status is presented through the portable device to the technician. The technician uses the acoustic pen, and follows the instruction from the portable device, to scan over the cable or the fiber set and find the corresponding fiber.

The portable device and the interrogator use a communication channel to exchange information. The communication channel can be wireless, such as cellular or Wi-Fi network or other means.

Figure 6:
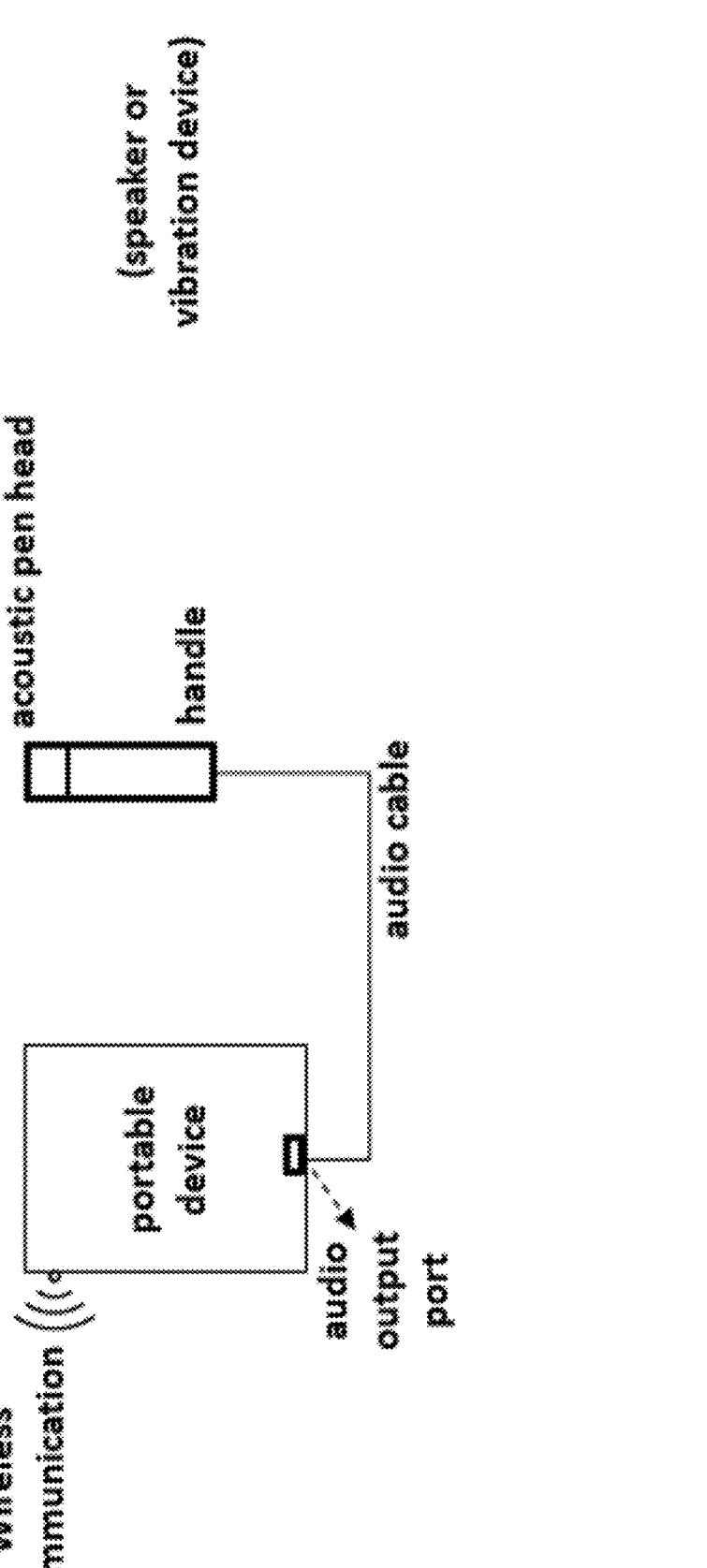
FIG. 6 is a schematic diagram of an acoustic pen and connection to a portable device according to aspects of the present disclosure.

FIG. 6 is a schematic diagram of an acoustic pen and connection to a portable device according to aspects of the present disclosure. The portable device drives the acoustic pen using an audio cable through its audio output port, as shown in the figure. The pen has an acoustic pen head, which may be a speaker, or a vibration device, or other similar functional elements. During the identification process, the field technician holds the handle and lets the pen head touch the fiber and moves across the fibers until the right one is located. In this process, the portable device interacts with the interrogator, and outputs the corresponding acoustic signal pattern during various stages.

Figure 7:
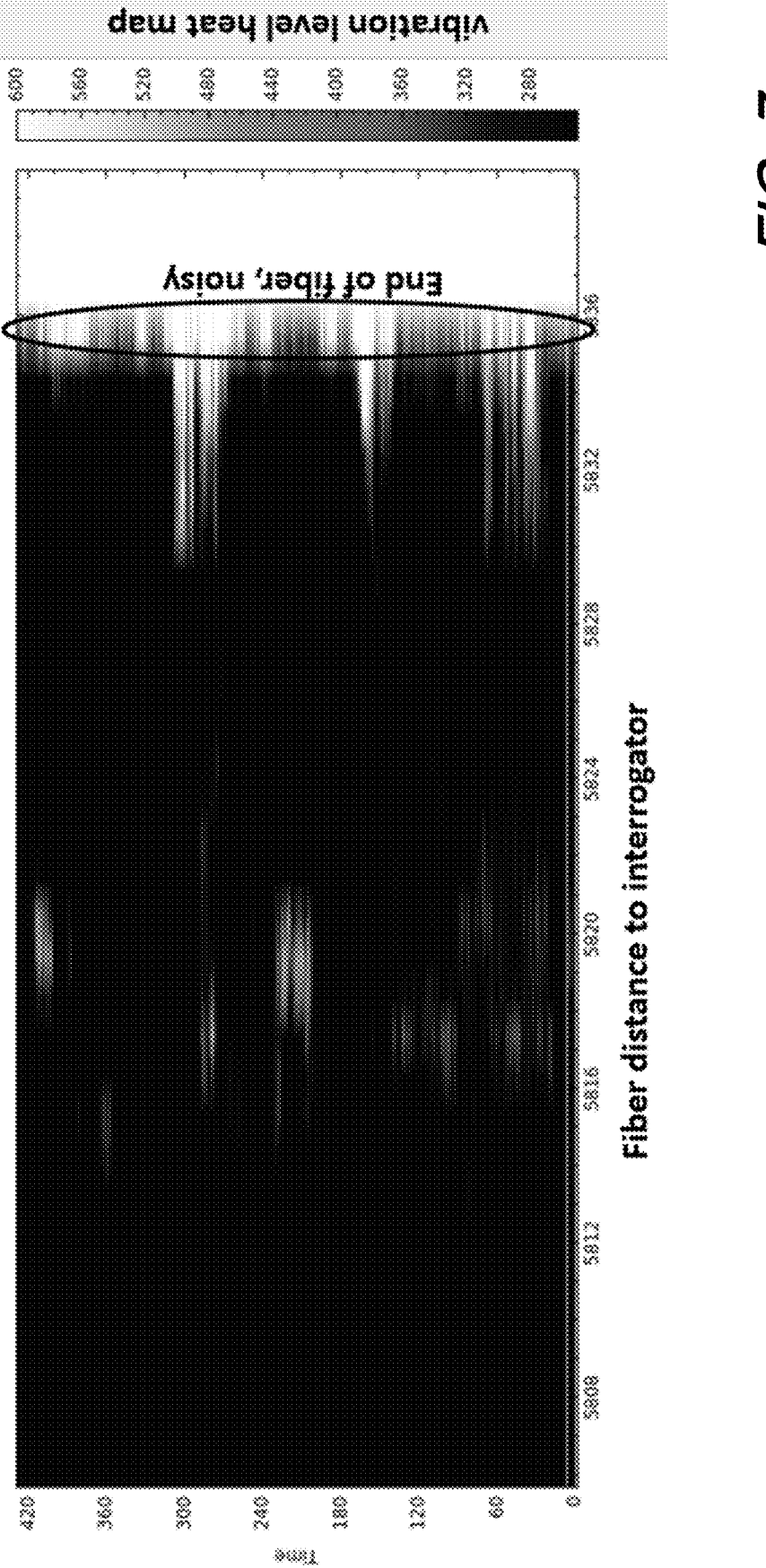
FIG. 7 is a plot showing an illustrative detected vibration heatmap exhibiting high noise at an end of the fiber according to aspects of the present disclosure.

FIG. 7 is a plot showing an illustrative detected vibration heatmap exhibiting high noise at an end of the fiber according to aspects of the present disclosure.

Usually, the cable section is much quieter than the free-hanging fibers where they are out of the cable for connection, so the interrogator can easily detect the vibration pattern in this section. Vibration pattern is the processed result from the sampled signal for each location. One example of such processing is to go through a band-pass filter which keeps only the band-of-interest, followed by a power-accumulator to make the vibration more noticeable. The processed vibration has much lower rate than the original samples, while containing enough information to identify the vibration; in addition, a simple thresholder may be used in signal detection, so it is very convenient in finding the location along the entire fiber. This is the method used in the first stage detection for cable and location identification.

Once the cable and the location are found, the detection moves to the second stage, which is to find the exact fiber within the found cable, usually close to the fiber end. Because of a noise result from vibration detection, the method used in stage 1 may not fit in this stage, so here the interrogator evaluates/analyzes details of the signal spectrum and its pattern. Depending on the fiber end condition, the background "signal" detected at the interrogator can be significantly different.

Figure 8A:
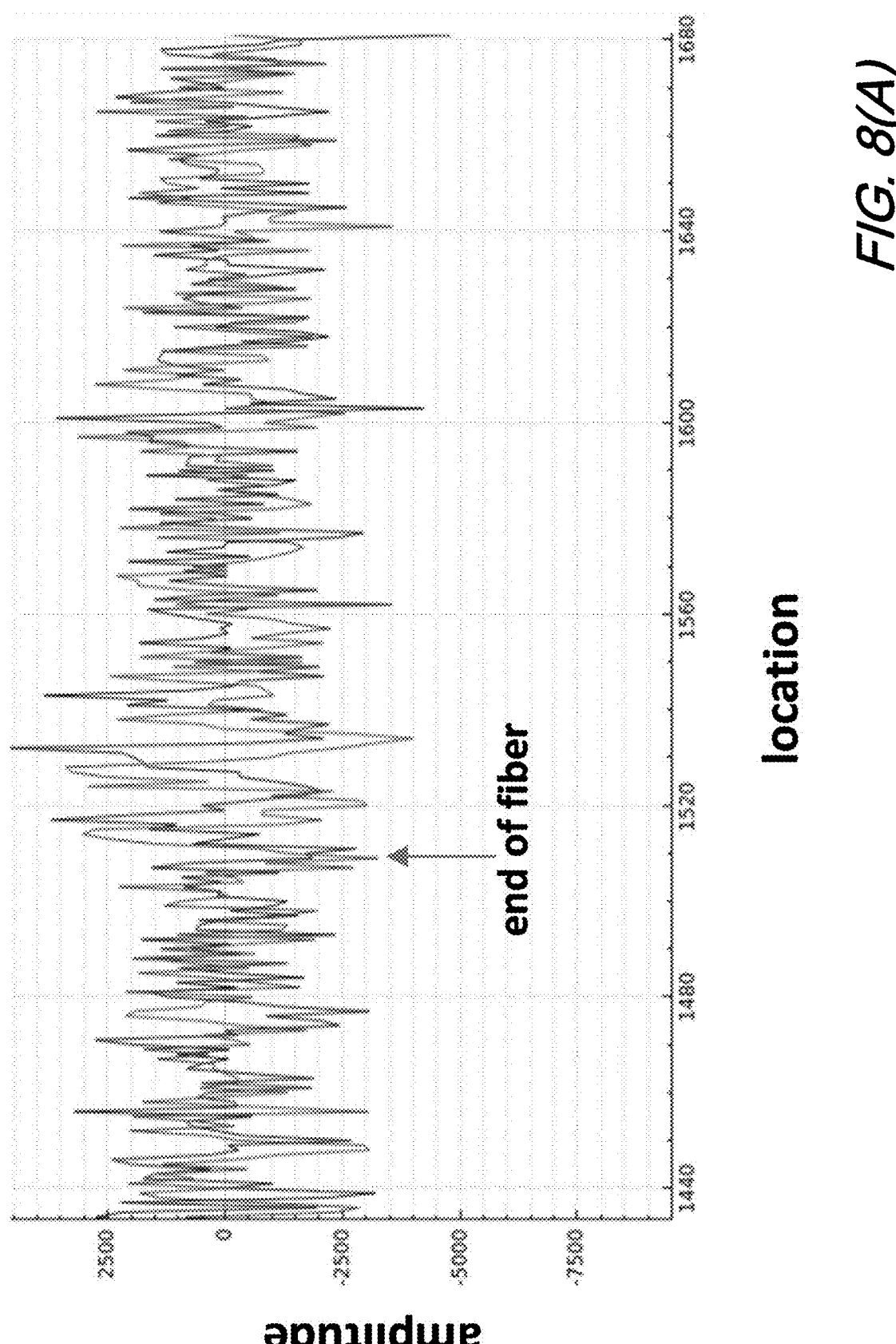
Figure 8B:
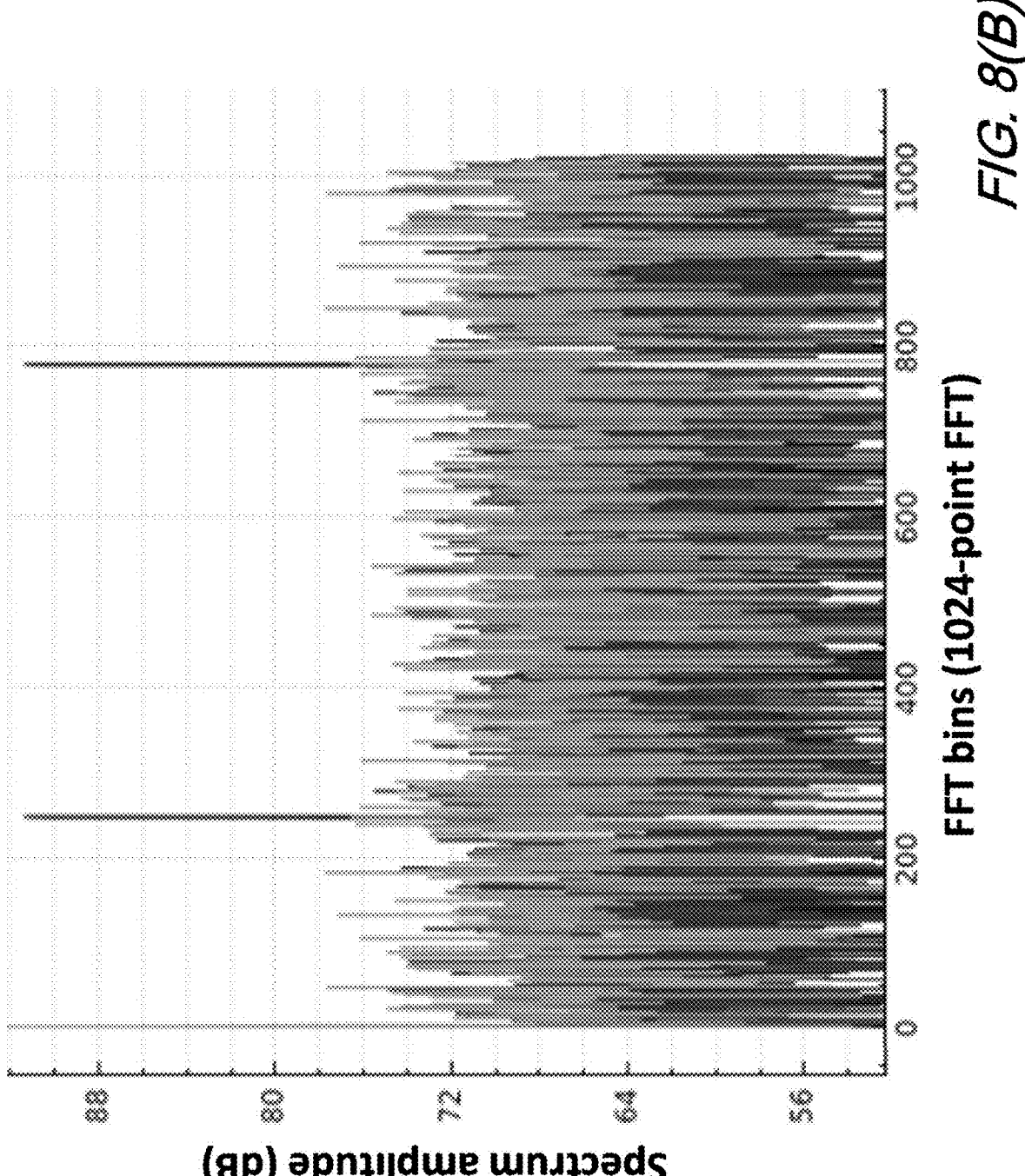
Figure 8C:
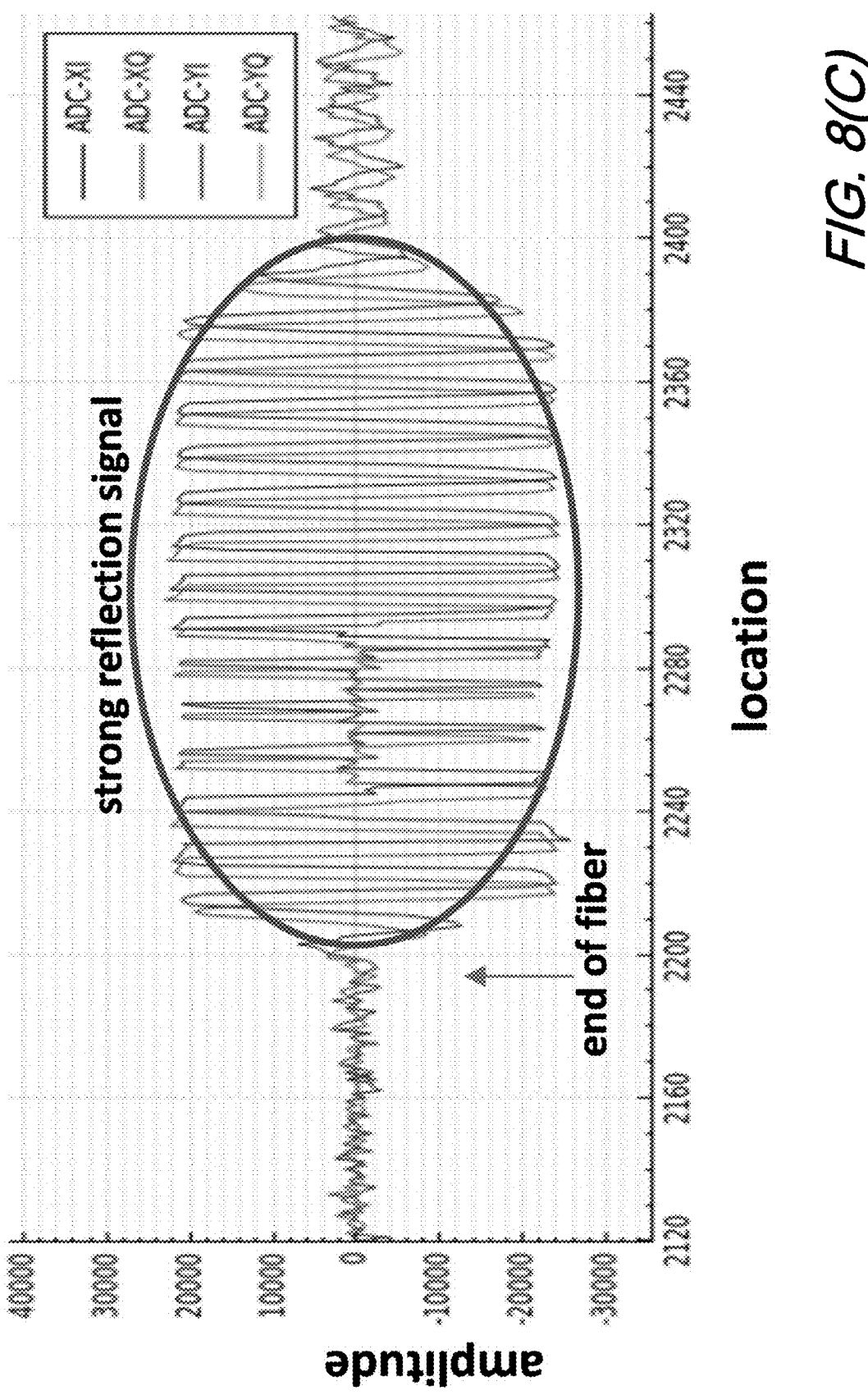
Figure 8D:
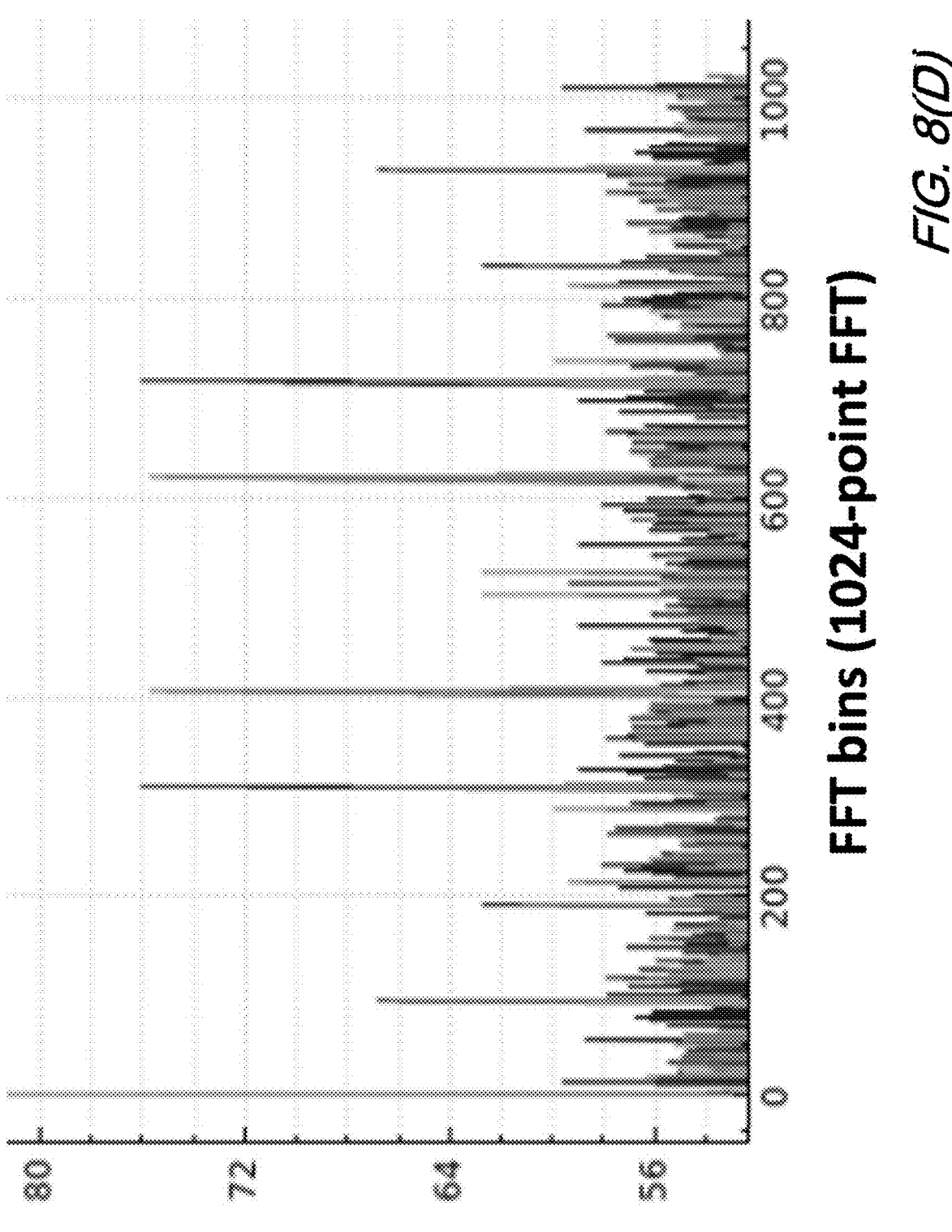
Figure 8E:
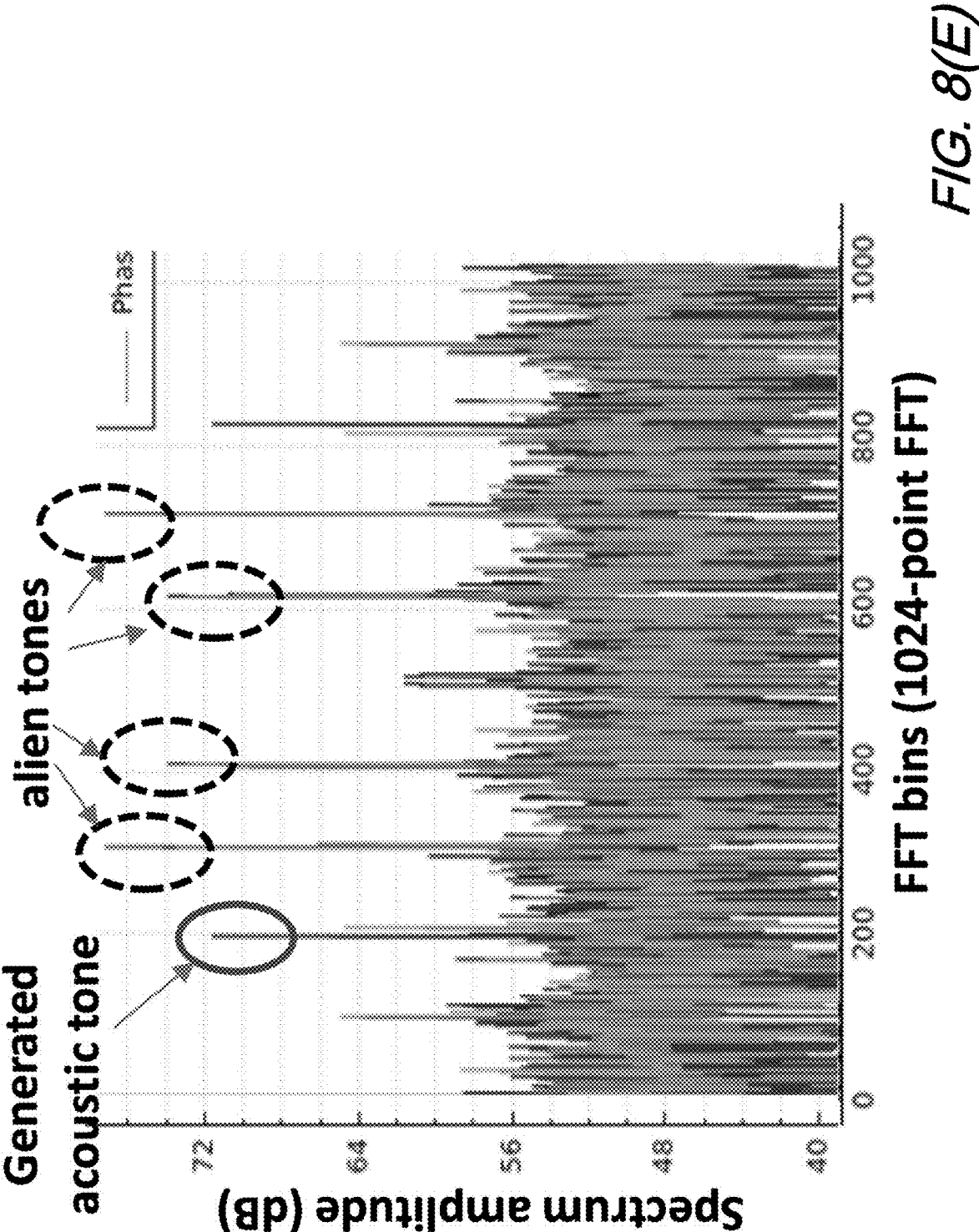

FIG. 8(A), FIG. 8(B), FIG. 8(C), FIG. 8(D) and FIG. 8(E) are a series of plots in which: FIG. 8(A) shows interrogator received signal amplitude with no or minor reflections; FIG. 8(B) shows interrogator signal spectrum at end of the fiber when reflection is low; FIG. 8(C) shows interrogator received signal amplitude with strong reflection; FIG. 8(D) shows interrogator processed signal at end of the fiber with strong reflection including alien tones; and FIG. 8(E) shows spectrum with generated acoustic signal and alien tones; all according to aspects of the present disclosure.

As shown in FIG. 8(A) and FIG. 8(B), when the reflection level is low, the recovered signal spectrum is clean. As shown in FIG. 8(C) however, when the reflected signal is strong, there could be many alien tones or other noise present. The interrogator must check the condition at the end of the fiber from processed signal and select the frequencies to avoid interference. The selected frequencies are sent to the portable device to generate the second stage pattern.

Figure 9A:
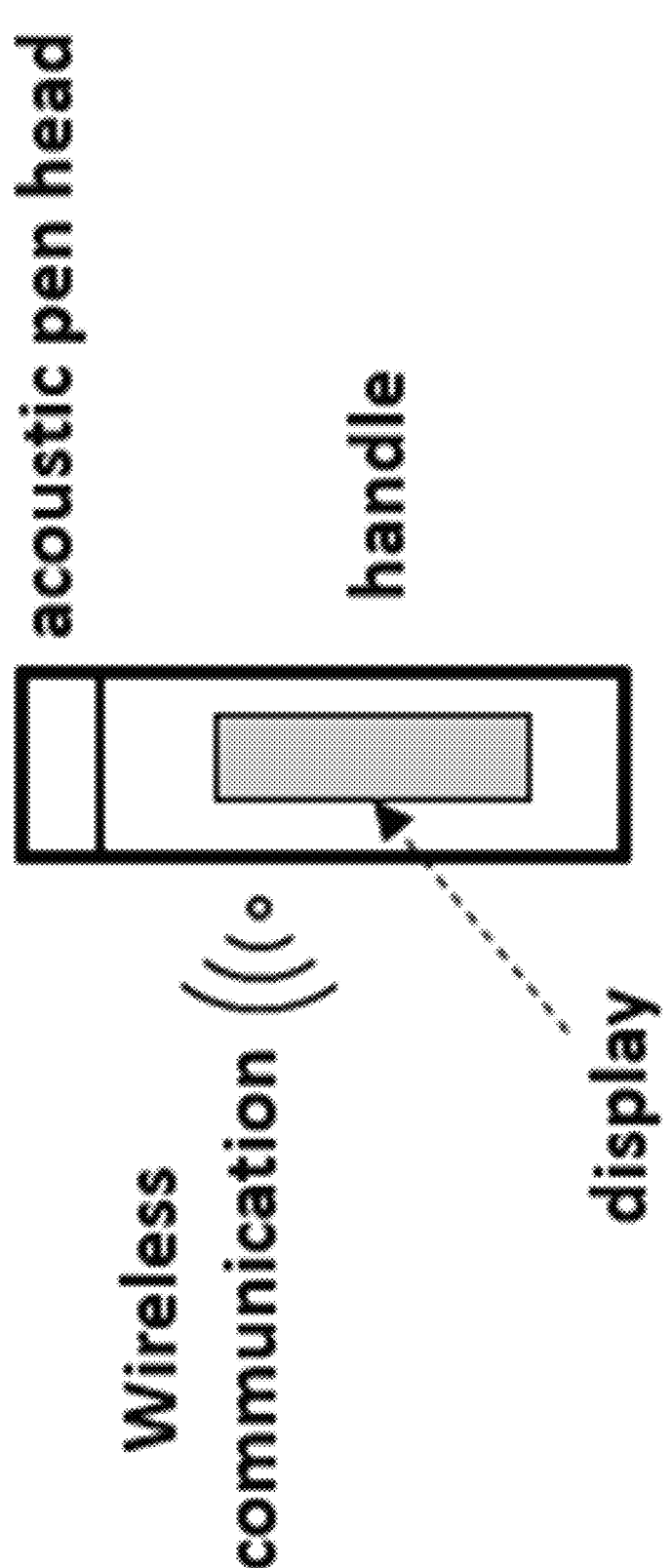
FIG. 9(A) is a schematic diagram showing an illustrative portable device integrated solution according to aspects of the present disclosure.

FIG. 9(A) is a schematic diagram showing an illustrative portable device integrated solution according to aspects of the present disclosure.

Figure 9B:
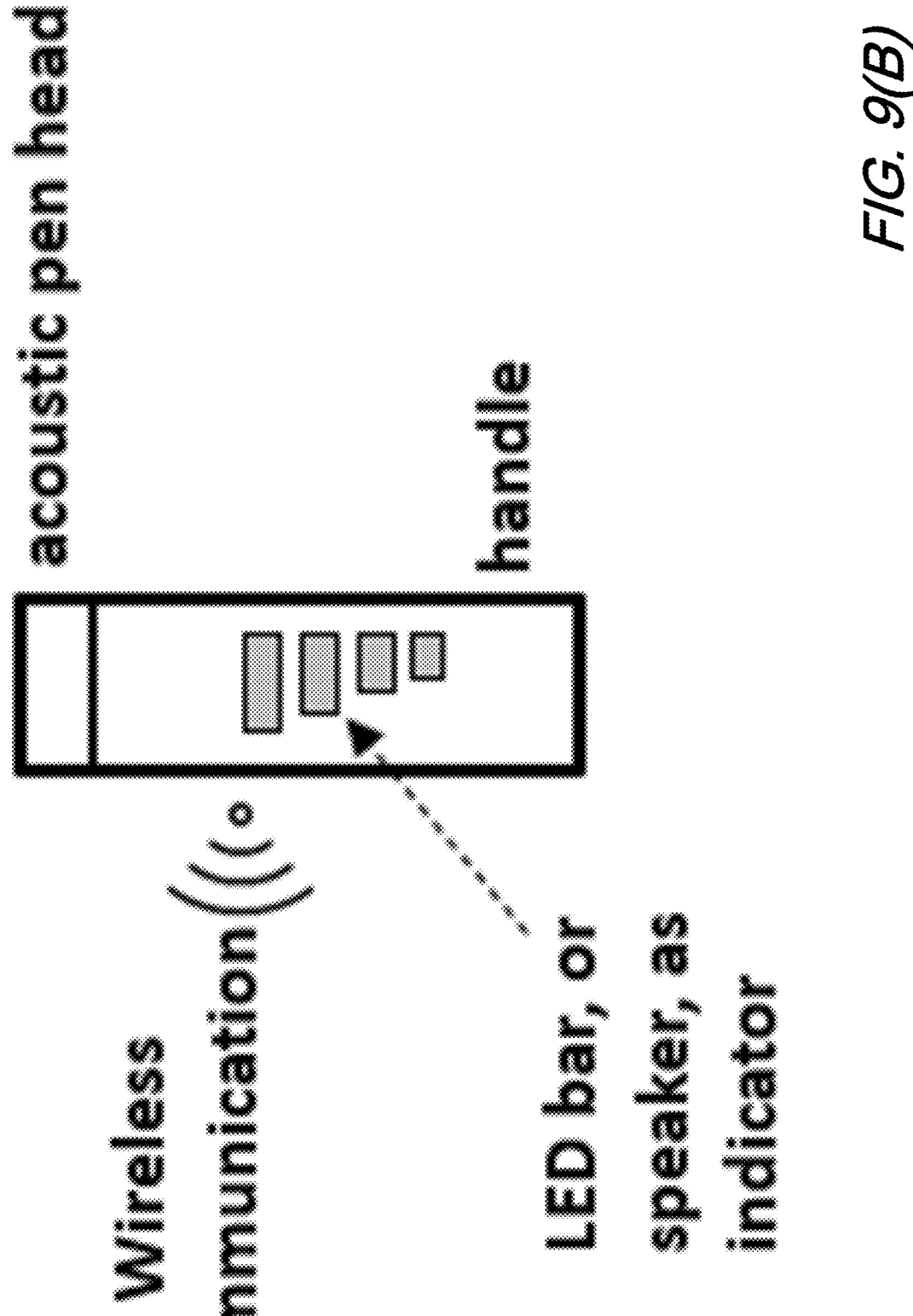
FIG. 9(B) Is a schematic diagram showing an illustrative portable device including LED bar or speaker as indicator according to aspects of the present disclosure.
Figure 10:
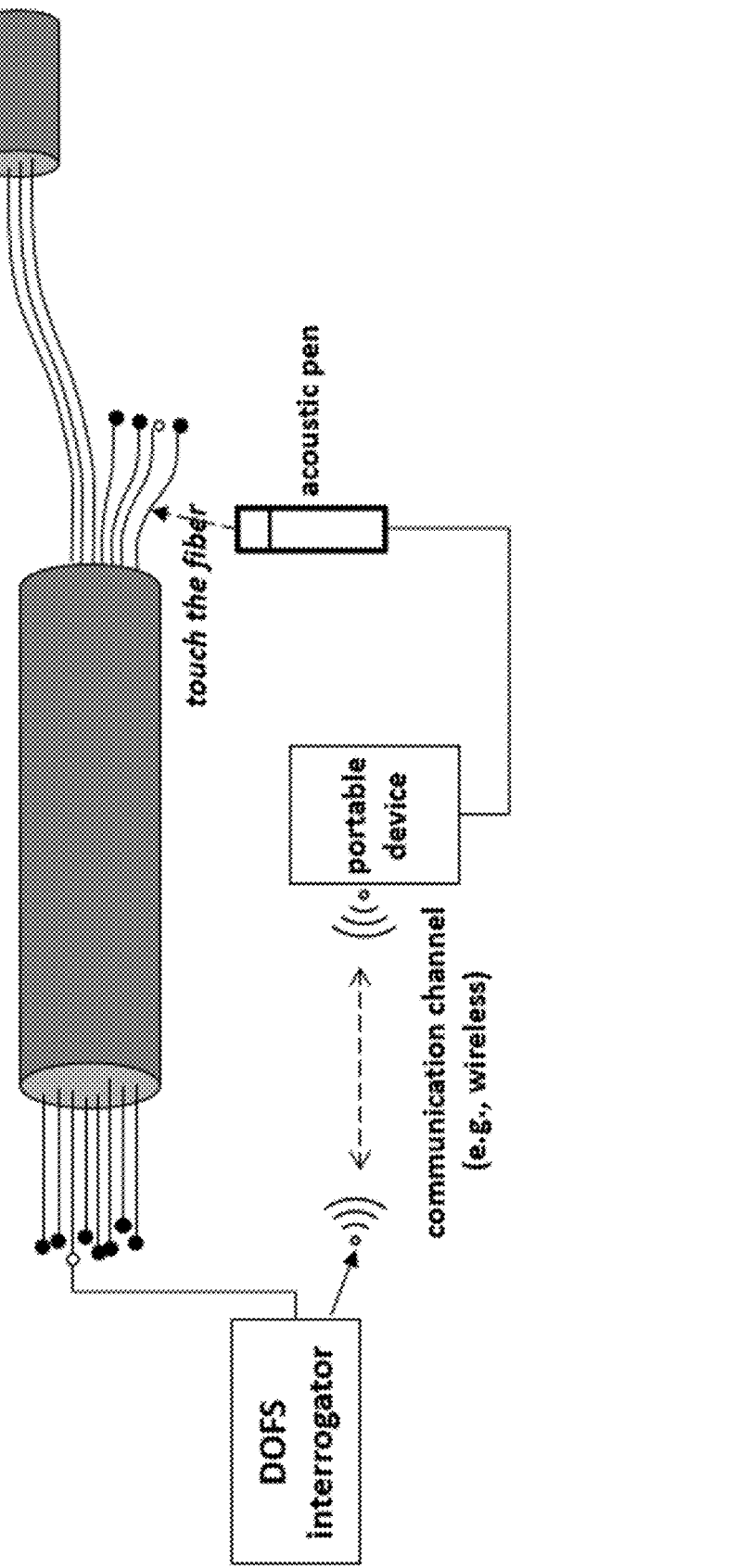
FIG. 10 is a schematic diagram of an acoustic pen configuration and operation according to aspects of the present disclosure.
Figure 11:
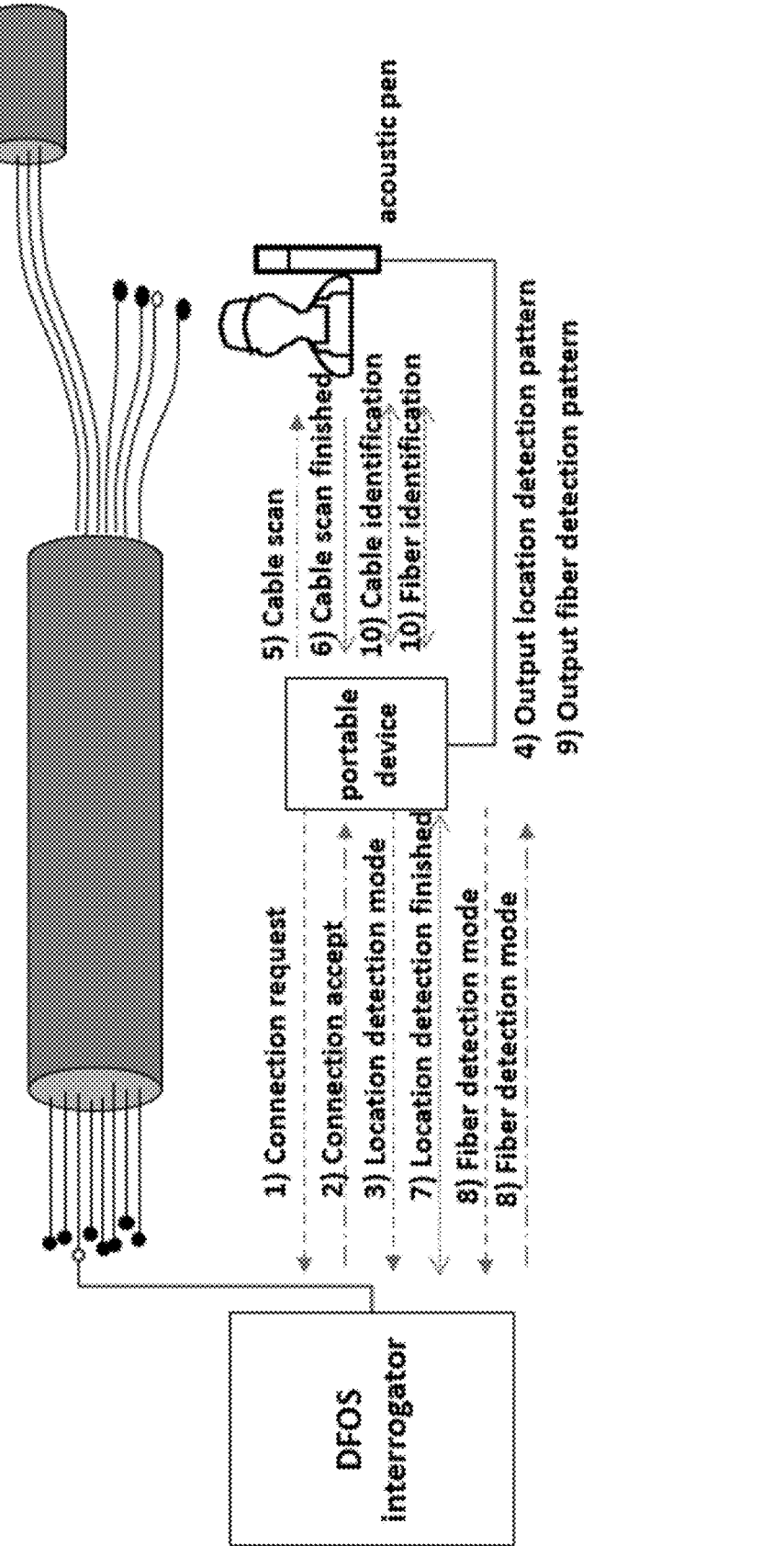
FIG. 11 is a schematic diagram of an acoustic pen configuration with external device and operation according to aspects of the present disclosure.

FIG. 9(B) Is a schematic diagram showing an illustrative portable device including LED bar or speaker as indicator according to aspects of the present disclosure.

Instead of using existing portable device and providing a pluggable acoustic pen, the pen and the device can be integrated, as shown in the figures. The device may have a display to show the signal response/detection status, or use LED bar for the detected signal level, or use a speaker generating another frequency not used by the detection process.

A simple example of an acoustic pen utilizes a speaker of the portable device. The fiber identification software interacts with the interrogator, and outputs the tone/pattern to the speaker. At the same time, it displays the level of response (the result received from the interrogator) on the GUI. The field technician holds the portable device and lets the speaker touch the cable or fiber.

At this point, while we have presented this disclosure using some specific examples, those skilled in the art will recognize that our teachings are not so limited. Accordingly, this disclosure should only be limited by the scope of the claims attached hereto.

The invention claimed is:

1. An optical cable identification method comprising:

operating a distributed fiber optic sensor (DFOS) system in optical communication with an optical sensor fiber of interest;

operating, at a field location remote from the DFOS system, an acoustic pen by contacting one or more optical fibers until an indication is provided that an optical fiber contacted by the acoustic pen is the optical sensor fiber of interest.

2. The method of claim 1 wherein the indication that an optical fiber contacted by the acoustic pen is the optical sensor fiber of interest is provided by a portable communicator in communication with the acoustic pen and the DFOS system.

3. The method of claim 2 wherein the portable communicator is in communication with the DFOS system wirelessly.

4. The method of claim 3 wherein portable communicator is configured to receive an excitation pattern communicated from the DFOS and communicate that received pattern to the acoustic pen.

5. The method of claim 4 wherein the acoustic pen contacts and excites a group of optical fibers at a time and the DFOS identifies to the portable communicator which group produced a strongest signal.

* * * * *